United States Patent [19]

Swope

[11] 4,229,244

[45] Oct. 21, 1980

[54] MANUAL BAG SEALER WITH LIFT BAR

[75] Inventor: Jack G. Swope, St. Ignace, Mich.

[73] Assignee: Rennco Incorporated, Homer, Mich.

[21] Appl. No.: 925,434

[22] Filed: Jul. 17, 1978

[51] Int. Cl.² ................... B30B 15/34; B65B 51/14
[52] U.S. Cl. .......................... 156/358; 53/373; 93/DIG. 1; 100/93 P; 156/366; 156/583.9
[58] Field of Search ............... 156/358, 366, 515, 583, 156/367, 583.2, 583.9, 583.1; 53/373; 93/DIG. 1, 33 H; 100/93 P

[56] References Cited

U.S. PATENT DOCUMENTS

| 2,496,609 | 2/1950 | Van Antwerpen | 53/122 |
|---|---|---|---|
| 3,001,457 | 9/1961 | Grevich et al. | 156/583.9 |
| 3,035,951 | 5/1962 | Braun et al. | 100/93 P |
| 3,106,630 | 10/1963 | Klamp | 156/583 X |
| 3,348,474 | 10/1967 | Virta et al. | 100/93 P |
| 3,428,512 | 2/1969 | Cooper | 156/512 |
| 3,692,611 | 9/1972 | Kühnle | 156/358 |
| 3,764,434 | 10/1973 | Bridenstine | 156/583 X |
| 4,080,242 | 3/1978 | Komenda et al. | 156/583 X |
| 4,097,326 | 6/1978 | Giulie et al. | 156/366 |
| 4,101,369 | 7/1978 | Adams | 156/583 X |

Primary Examiner—Michael G. Wityshyn
Attorney, Agent, or Firm—Blanchard, Flynn, Thiel, Boutell & Tanis

[57] ABSTRACT

A heat-sealing apparatus having a fixed upper clamping jaw which defines therein a continuously energized resistance-type heater. A lower clamping jaw is supported on the frame for pivoting movement about a substantially horizontal axis, so that the lower clamping jaw can be manually swung upwardly to engage the upper jaw and clamp the mouth of a filled preformed bag therebetween. The lower clamping jaw, when manually swung upwardly, activates a control arrangement which holds the lower jaw in its closed position for a predetermined time and at a substantially predetermined pressure, thereby permitting effective sealing of the bag mouth. The control arrangement automatically terminates the clamping engagement between the jaws, whereby the lower jaw automatically swings downwardly to permit release and removal of the sealed bag.

12 Claims, 4 Drawing Figures

MANUAL BAG SEALER WITH LIFT BAR

FIELD OF THE INVENTION

This invention relates to an improved apparatus for heat sealing the mouth of a preformed bag or pouch which is at least partially of a heat-sealable material, such as a thermoplastic.

BACKGROUND OF THE INVENTION

Numerous machines have been developed for forming heat sealable bags or pouches from a continuous roll of stock, such as folded thermoplastic sheet material. Most of these known machines form the bag from roll stock, following which the bag is filled, and thereafter the mouth is sealed. Machines of this general type are necessarily of substantial mechanical complexity and size, and hence have been unacceptable in many situations which do not require or justify the use of a machine of this type. The cost and overall mechanical complexity of these machines, and the periodic maintenance thereof, thus make machines of this type unacceptable in many situations.

In order to service those situations wherein machines of the latter type are not acceptable, there have been developed heat-sealing machines which are of minimum size and structural complexity, and hence of substantially less cost. These known machines, which are generally manually actuated, are basically capable solely of heat sealing the mouth of a preformed bag after filling thereof. However, these known machines have also normally been less than satisfactory, either structurally or operationally.

Machines of the latter type which solely seal the mouth of a bag, and hence require the use of preformed bags, have satisfied a demand in the market place, such as the demand of hospitals and the like. However, these known manually-actuated machines possess disadvantages which make their use less than satisfactory. For example, such machines often utilize a foot-actuated pedal and linkage for moving one of the sealing jaws. This is undesirable in view of the additional space required therefor, and the difficulties created when it is desired to position a machine of this type on an existing table or counter. These known machines also conventionally utilize a manually movable upper jaw positioned for clamping engagement with a fixed lower jaw, and this arrangement makes it more difficult to manually position and hold the mouth of the bag between the jaws while simultaneously actuating the upper jaw into clamping engagement with the lower jaw. Still further, most of these known machines utilize an impulse-type heating element for melting and sealing the mouth of the bag, which heating element is more delicate and thus more subject to damage, and additionally requires a greater time period in order to effect proper heat sealing of the bag mouth. Impulse sealers also normally result in a higher temperature, which is also unacceptable for use with some types of sealable bags. Another disadvantage of these known machines is the difficulty associated with providing a controlled yet uniform clamping pressure when the bag mouth is held between the opposed jaws, coupled with a controlled yet optimum period of time during which the bag mouth is exposed to the heating and clamping pressure so as to provide an optimum seal.

Accordingly, it is an object of this invention to provide an improved apparatus which overcomes many of the above-mentioned disadvantages. More specifically, it is an object of this invention to provide an improved apparatus for heat sealing the mouth of a preformed bag or pouch, which apparatus can be manually actuated but provides optimum heating temperature and clamping pressure to provide a desirable seal across the bag mouth, while permitting this sealing operation to be accomplished in a simple and efficient manner.

It is also an object to provide an improved apparatus, as aforesaid, which utilizes a stationary upper heating element of the resistance type which is effectively continuously energized to thereby permit utilization of a lower heating temperature, whereby the apparatus is usable with bags formed of many materials, and which fixed upper clamping jaw coacts with a vertically movable lower clamping jaw to facilitate the insertion of the bag mouth between the jaws and the holding thereof during the heat-sealing operation, and the removal of the sealed bag from the apparatus upon completion of the sealing operation.

A further object is to provide an improved apparatus, as aforesaid, which can be easily manually activated by inserting the bag mouth between the jaws and then manually lifting the lower jaw upwardly, which in turn activates the apparatus so that the lower clamping jaw is held snugly against the stationary upper clamping jaw for a predetermined time at a substantially predetermined pressure, following which the lower jaw is automatically moved downwardly to permit removal of the sealed bag.

Still a further object is to provide an improved apparatus, as aforesaid, which is small and compact, structurally simple, reliable, easy and efficient to operate, relatively inexpensive, lightweight, portable, and can be easily positioned on an existing table, counter or the like.

Other objects and purposes will be apparent to persons familiar with apparatus of this general type upon reading the following specification and inspecting the accompanying drawings.

Figure 1:
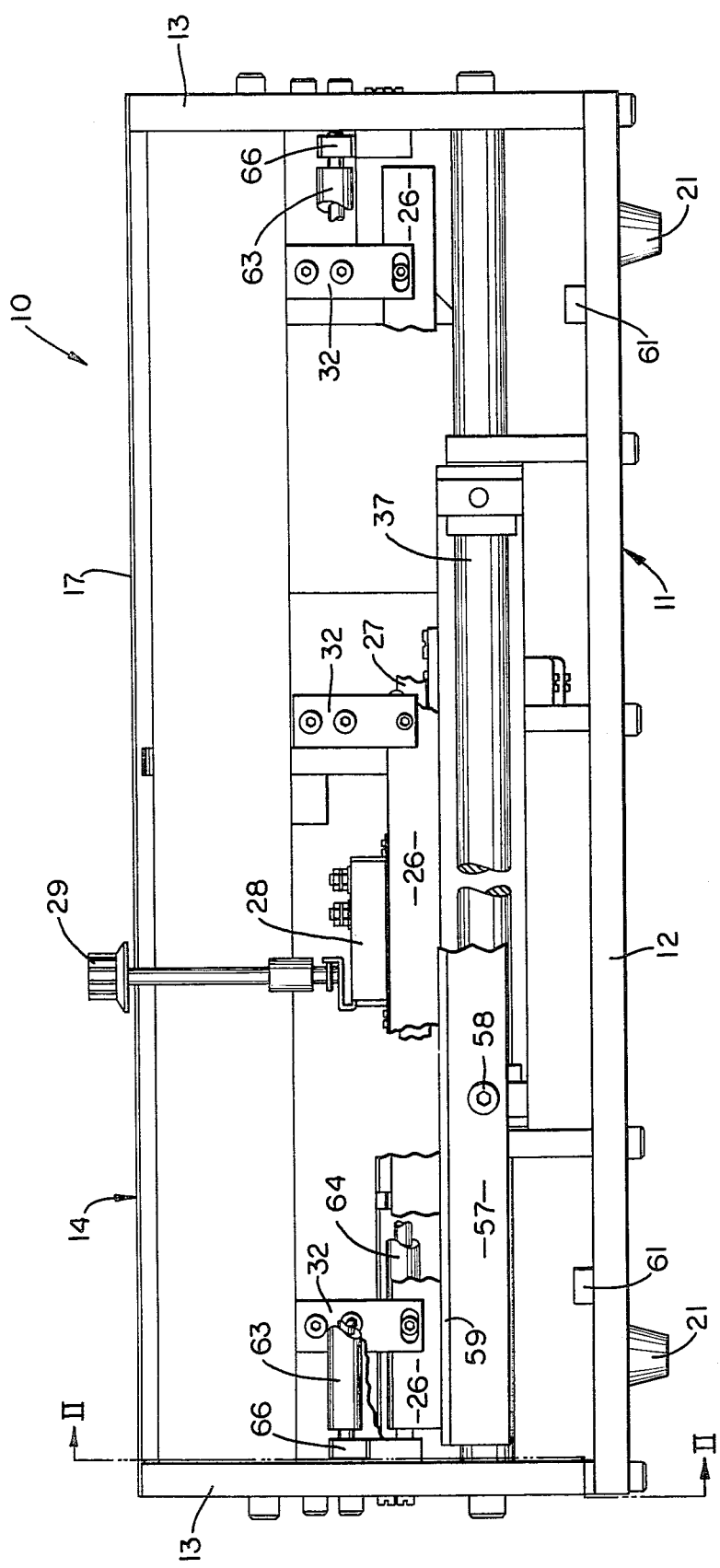
FIG. 1 is a front elevational view of the improved apparatus, same being illustrated with the cover removed.

Certain terminology will be used in the following description for convenience in reference only and will not be limiting. For example, the words "rightwardly", "leftwardly", "upwardly" and "downwardly" will refer to directions in the drawings to which reference is made. The words "front" or "rear" will have reference to the right and left sides, respectively, of the machine as appearing in FIG. 2. The words "inwardly" and "outwardly" will refer to directions toward and away from, respectively, the geometric center of the machine and designated parts thereof. Said terminology will include the words specifically mentioned, derivatives thereof, and words of similar import.

SUMMARY OF THE INVENTION

The objects and purposes of this invention, including those mentioned above, are provided by a heat-sealing apparatus having a fixed upper clamping jaw which defines therein a continuously energized resistance-type heater. A lower clamping jaw is supported on the frame for pivoting movement about a substantially horizontal axis, so that the lower clamping jaw can swing upwardly to engage the upper jaw and clamp the mouth of a filled preformed bag therebetween. The lower clamping jaw, when manually swung upwardly, activates a control arrangement which holds the lower jaw in its closed position for a predetermined time and at a substantially predetermined pressure, thereby permitting effective sealing of the bag mouth. The control arrangement automatically terminates the clamping engagement between the jaws, whereby the lower jaw automatically swings downwardly to permit release and removal of the sealed bag.

DETAILED DESCRIPTION

The drawings illustrate therein a heat-sealing apparatus 10 which includes a substantially closed box-like housing 11. This housing includes a base plate 12 to which the secured upwardly projecting end plates 13. A cover 14 of a substantially U-shaped configuration extends between the end plates, which cover defines a rear wall 16, a top wall 17 and a partial front wall 18. A plurality of screws 19 permit the cover 14 to be releasably attached to the base and end plates. Feet 21 are secured to the underside of the base plate to permit the apparatus 10 to be supported on a conventional horizontal work surface, such as a counter or table top.

The apparatus 10 has a pair of opposed clamping jaws 22 and 23 provided on the front side thereof for permitting the open mouth of a preformed heat sealable bag 24 to be sealingly closed.

The upper clamping jaw 22 is stationarily positioned relative to the housing and includes an elongated clamping bar 26 constructed of a material having a high heat-transfer coefficient, such as aluminum. This bar 26 extends horizontally across a majority of the width of the apparatus, and is of an upwardly opening channel-like configuration so as to confine therein a conventional elongated resistance-type heater 27. Electrical energy is supplied to the heater 27 in a conventional manner, with the temperature of the heater being controlled by a conventional thermostat 28, the latter in turn being adjusted by an external manually rotatable knob 29.

Figure 2:
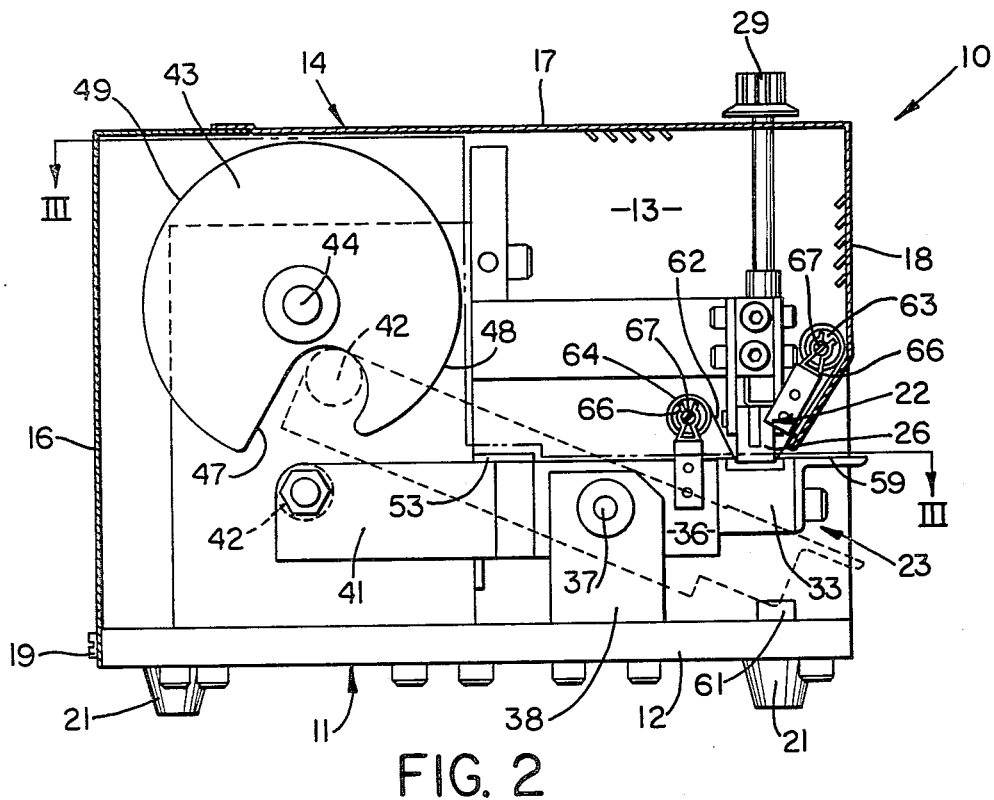
FIG. 2 is an end elevational view of the apparatus, the end plate being removed so that the view is taken substantially along line II—II in FIG. 1.
Figure 4:
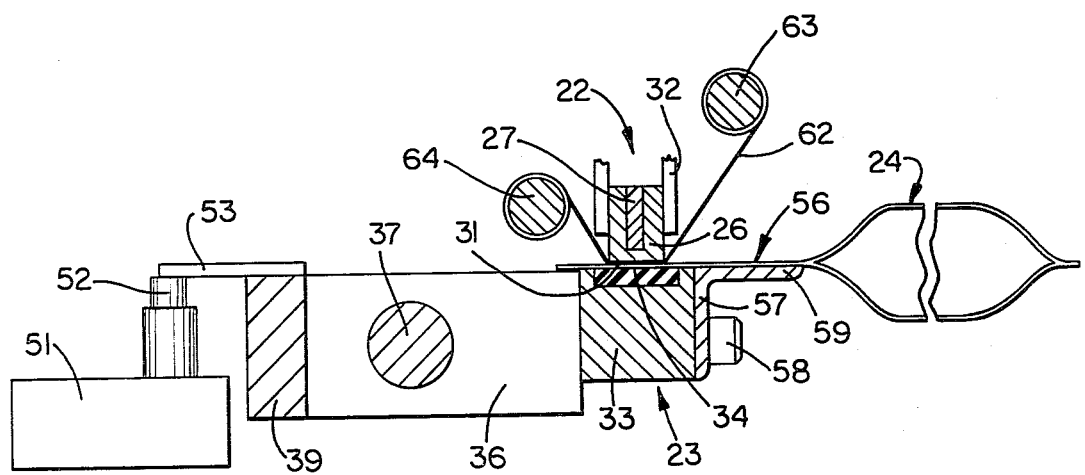
FIG. 4 is an enlarged, fragmentary sectional view taken substantially along the line IV—IV in FIG. 3.
Figure 3:
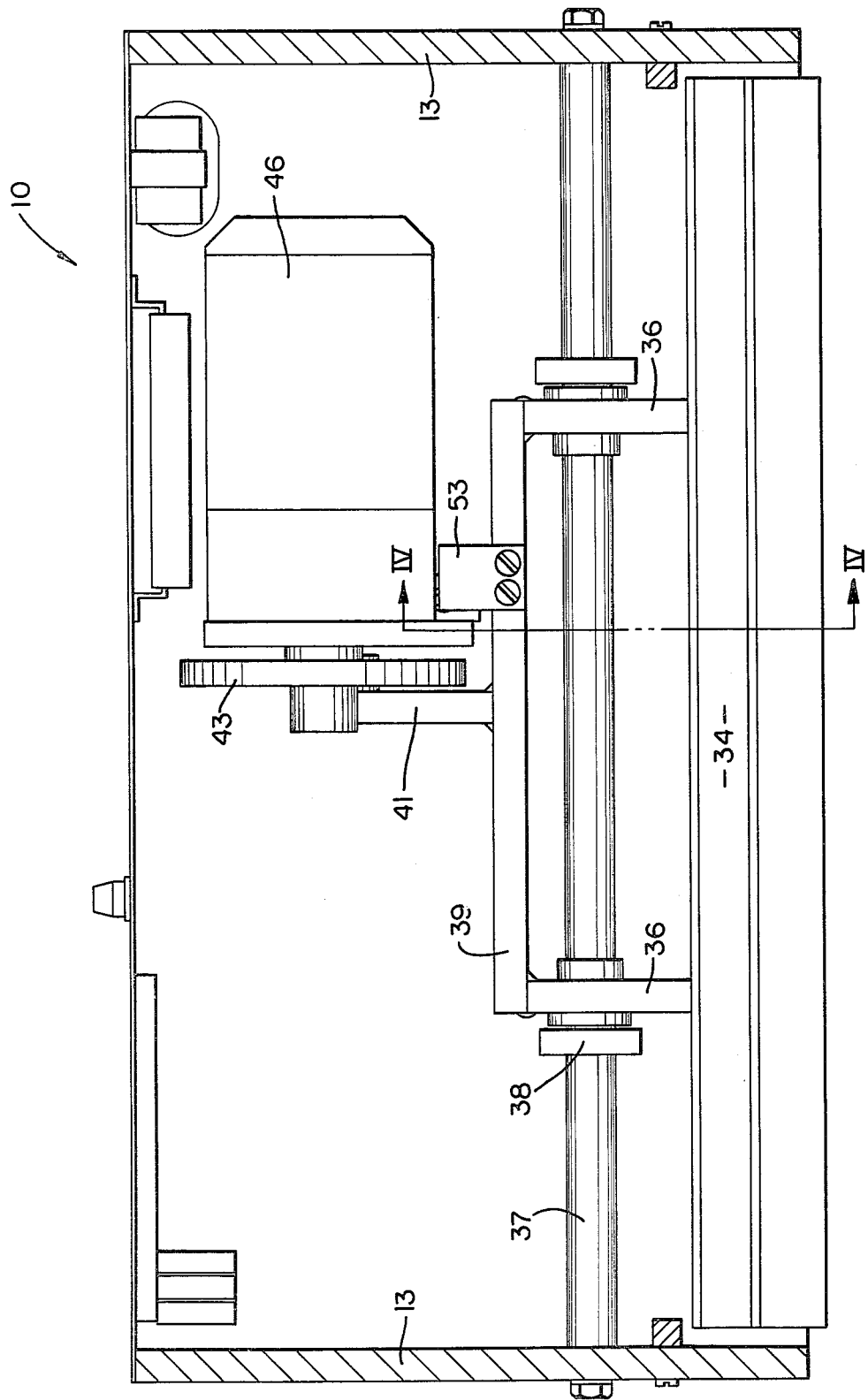
FIG. 3 is a view taken substantially along the line III—III in FIG. 2.

The clamping bar 26, which defines a flat pressing surface 31 on the lower side thereof, is fixedly held by several pairs of support plates 32, which plates in turn are fixedly secured relative to the housing. The lower edge of the upper clamping jaw 22 is positioned directly behind and slightly below the lowermost edge of the front housing wall 18, as illustrated in FIG. 2.

The lower clamping jaw 23 is movably supported on the housing so as to be movable upwardly to clampingly engage the mouth of the bag 24 between the jaws 22 and 23. For this purpose, the lower jaw 23 also includes a horizontally elongated clamping bar 33 which extends horizontally below and in parallel relationship to the upper clamping bar 26. Clamping bar 33 has an elongated cushioning element 34 disposed in a shallow recess formed in the upper surface thereof. This cushioning element 34, which is constructed of an elastic deformable material such as silicone rubber, has length and width dimensions which are slightly greater than those of the upper clamping bar 26 so that the latter can be moved into secure engagement with the cushioning strip 34 and cause at least a limited compression thereof.

The lower clamping bar 33 has a pair of parallel support arms 36 fixed thereto and projecting rearwardly therefrom, which arms are pivotally supported on an elongated pivot rod 37 which extends horizontally across the apparatus and has the opposite ends thereof supported on the end walls 13, with intermediate portions of the pivot rod 37 being supported by upright supports 38. The rearward ends of arms 36 are joined by a cross member 39, and the latter has a further arm 41 projecting rearwardly therefrom and effectively forming an extension of the front arms 36. The rearward arm 41 has a conventional cam roller 42 rotatably supported thereon adjacent the rearward end thereof, which roller is supported for rotation about a horizontal axis which extends parallel to the horizontal pivot axis defined by rod 37.

The cam follower 42 is designed for cooperation with a rotary control cam 43 to regulate both the pressure and time during which the bag is pressingly held between the opposed jaws 22 and 23. The cam 43 is rotatable about a horizontal axis which extends parallel to the pivot rod 37 and, for this purpose, is secured to the projecting drive shaft 44 of a power unit 46, which unit 46 comprises a conventional electric motor-brake unit.

The cam 43 has a slot 47 projecting radially inwardly from the periphery therefrom, which slot is designed to accommodate therein the follower 42. Except for the slot 47, the cam 43 otherwise closely approximates a circular disc. However, the outer periphery of the cam includes a first peripheral portion 48 which projects circumferentially away from one edge of the slot 47 through an angle which normally is in the range of between 45° and 90°. The surface 48, as it projects away from the slot 47, is of gradually increasing radius as measured about the rotational axis of the cam. The cam surface 48 then merges into a cam surface 49 which extends around the remainder of the cam, which cam surface 49 is of uniform radius as generated about the cam rotational axis.

To activate the motor-brake unit 46, and hence cause rotation of the cam, there is provided a start switch 51, the housing of which is mounted on the base 12. This start switch 51 has a movable, upwardly projecting plunger 52 which is normally resiliently urged upwardly to maintain the switch in an opened condition. Plunger 52 is disposed so as to be contacted by an actuator plate 53 fixed on arm 41 when the lower clamping jaw 23 is manually swung upwardly, whereby the actuator plate 53 depresses the switch plunger 52 and closes the switch 51, thereby energizing the motor 46.

The lower clamping jaw 23 also has an actuating handle 56 fixed thereto, which handle is of an L-shaped or angled configuration and includes a lower vertical leg 57 fixed to the front face of the lower clamping bar 33, as by means of screws 58. The upper horizontal leg 59 of handle 56 is substantially flush with and projects outwardly from the upper surface of the lower clamping jaw, whereby this leg 59 permits the lower jaw to be manually engaged and easily swung upwardly. The upper surface of this horizontal leg 59 also functions as a support for permitting the bag to be held thereagainst during the sealing operation.

To prevent impacting of the lower jaw against the base when the jaw swings downwardly, there is provided one or more resilient stops 61 which are fixed to the upper surface of the base and are disposed for engaging, and defining the lower position of, the jaw 33, as indicated by dotted lines in FIG. 2.

To prevent sticking of the molten plastic on the upper clamp bar 26, the apparatus also includes a roll of thin Teflon-impregnated fiberglass 62 which passes directly under the upper clamp bar 26 and is supported on a pair of rolls or reels 63 and 64. The front reel 63, which functions as the supply reel, extends between and is rotatably supported on a pair of spring clamps 66 mounted on the housing end walls 13. The other reel 64, which functions as a take-up reel, is positioned behind the top clamping jaw. This reel 64 also extends between the end walls and is rotatably supported on spring-type clips 66. At least one of the end walls 13 has suitable openings therethrough and aligned with the reels 63 and 64, which reels have slots 67 extending across the ends thereof so that a screwdriver or like tool can be inserted through the end wall and engaged with the two reels to rotate same, thereby permitting the fiberglass sheet to be advanced across the upper clamping member 26.

OPERATION

The operation of the sealing apparatus 10 will be briefly described to insure a complete understanding thereof.

The apparatus is normally maintained in an open position wherein the lower jaw 23 is spaced downwardly from the upper jaw 22, as indicated by dotted lines in FIG. 2. When in this normal open or inactive position, the cam roller 42 projects into the slot 47. The lever arm mechanism supporting the lower clamping bar 33 is normally swingably urged clockwise about its pivot into the dotted lowermost position due to the weight of the lower jaw.

When the mouth of a filled heat-sealable bag 24 is to be sealed, the mouth is positioned over the cushioning strip 34 associated with the lower jaw and, while holding the bag mouth on the lower jaw, the gripping flange 59 is lifted upwardly until the lower jaw and the bag thereon come into contact with the fiberglass strip 62 which extends around the upper clamping bar 26. When the lower jaw reaches this upper position, the actuator plate 53 contacts and depresses the button 52 of switch 51, thereby closing the switch and energizing the motor-brake unit 46. The motor then causes clockwise rotation of cam 43 so that the roller 42 initially contacts the cam surface 48 which, due to its ramplike profile, causes the roller 42 to be urged downwardly so that the lower clamping jaw 33 is thus pushed upwardly causing the upper clamping jaw 26 to partially compress and snugly engage the cushioning strip 34. After passing over the ramp surface 48, the roller 42 then remains in engagement with the uniform circular cam surface 49, thereby maintaining a constant and uniform pressure between the upper and lower clamping jaws. After the cam roller moves into engagement with the cam surface 48 and continues along the cam surface 49, the operator can remove his hands from the actuator flange 59, so that the hands can thus be used solely to support the bag 24 if desired.

After the cam 43 completes one complete revolution, the slot 47 is again aligned with the roller 42 whereby the downward or counterclockwise urging of the lower jaw, due to its weight, causes the roller 42 to move upwardly into the slot 47. This positively stops the cam 47 and, since the switch 51 reopens, this de-energizes the motor and energizes the brake associated with the power unit 46 to thereby positively stop the cam rotation. At the same time, the downward swinging of the lower jaw 23 completely releases the bag, the mouth of which has now been sealed, so that the operator can discharge the sealed bag to some other location, and thereafter a further bag can be sealed following the same above-described technique.

With the heat-sealing apparatus of this invention, each heat-sealing cycle, as defined by one complete revolution of the cam, normally can be accomplished in about two and one-half seconds. During this cycle, the initial part of the cycle results in a gradual pressure buildup between the jaws and a rather gradual heating of the bag, due to the ramplike cam 48. However, during that phase when roller 42 engages the uniform cam periphery 49, then a constant uniform pressure is maintained between the jaws, which also results in a uniform sustained heating of the bag, this phase of the cycle lasting for approximately two seconds. This cam arrangement thus provides for very precise control over the clamping pressure and hence the amount and duration of heating of the bag.

When utilizing the apparatus of this invention, and specifically the rotary cam for controlling the lower jaw and hence the clamping pressure between the jaws, a uniform sustained pressure in the order of thirty pounds per square inch can normally be achieved between the jaws. This thus permits proper heating and sealing of the bag mouth during a short time span, such as approximately two to three seconds. In contrast, impulse-type heaters normally are unable to withstand pressures of this magnitude due to the fragile structure of such heaters, and hence the typical heating cycle of an impulse-type heater normally requires around eight seconds to achieve a proper heat-sealing operation. The structure of this invention thus possesses significant advantages in comparison to impulse-type heaters.

In addition, by utilization of the Teflon-impregnated fiberglass sheet 62, this prevents the molten plastic from sticking to the upper clamp bar 26. This sheet 62 is also believed to assist the sealing operation since, even though substantially high pressure exists between the clamping jaws, nevertheless the mesh-like structure of this sheet 62 is believed to prevent the melted plastic from squeezing out from between the jaws.

The use of the tapered cam surface 48 for permitting a more gradual increase in the clamping pressure is also believed desirable from the standpoint of enabling this apparatus to be utilized on bags formed from different types of materials, such as paper-plastic laminations including conventional polyethylene bags. This cam ramp 48 is believed to permit a more gradual preheating of the bag material before the maximum pressure and temperature is applied, thereby providing a stronger and better seal.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a heat-sealing machine for sealing the open top of a manually-held preformed heat-sealable bag, said machine including a housing, a pair of jaws mounted on said housing adjacent the front vertical side thereof for permitting the open top of a bag to be manually inserted between said jaws, said jaws being disposed in opposed and relatively movable relationship toward and away from one another for permitting the open top of a preformed bag to be manually held therebetween, heater means associated with one of said jaws for creating a sealing strip across the bag adjacent the top thereof when the latter is held between the jaws, wherein said pair of jaws includes first and second jaws which are horizontally elongated and are positioned vertically one above the other, the improvement comprising said first jaw being disposed uppermost and being fixedly and stationarily connected relative to said housing, said heater means being fixedly associated with said first jaw, said second jaw being positioned vertically below said first jaw and movable substantially vertically between a lowered open position wherein the second jaw is spaced downwardly from the first jaw and a raised closed position wherein an upper clamping surface on said second jaw is substantially engaged with a lower clamping surface on said first jaw for permitting the open top portion of the bag to be clampingly held therebetween, support means movably mounting said second jaw on said housing for movement between said open and closed positions and for normally urging said second jaw into said open position, hand-engaging handle means fixed to said second jaw for permitting said second jaw to be manually moved upwardly from said open position into said closed position, said hand-engaging handle means being disposed closely adjacent and projecting forwardly from the clamping surface of said second jaw so that an operator can manually hold the bag top between the jaws and simultaneously lift the second jaw upwardly into said closed position, sensing means for sensing the positioning of said second jaw substantially in said closed position, power means activated by said sensing means for holding said second jaw in said closed position for a preselected time and for then automatically releasing said second jaw whereby said support means automatically returns said second jaw into said open position, said support means including elongated lever means pivotally supported on said housing for swinging movement about a substantially horizontal pivot axis which is spaced from and substantially parallel to the elongated direction of said second jaw, said second jaw being mounted on said lever means at a location spaced a substantial distance from said pivot axis, and said power means being engageable with said lever means at a predetermined location thereon which is spaced from said pivot axis when said jaw is in said closed position for both holding said jaw in said closed position for said predetermined time and applying a controlled clamping pressure between said jaws throughout said predetermined time, said power means including first means for gradually increasing the clamping pressure between said jaws during an initial portion of said predetermined time and second means for maintaining a constant clamping pressure between said jaws during the remainder of said predetermined time.

2. A machine according to claim 1, wherein said heater means comprises a continuously energized resistance-type heater fixedly positioned within and extending longitudinally along said first jaw, said second jaw having in the upper portion thereof an elongated resiliently compressible strip disposed for engagement with the lower surface of said first jaw when said second jaw is in said closed position, and said second jaw having a plate-like flange fixed thereto and projecting outwardly from the front side thereof in substantially coplanar relationship with the upper surface of said second jaw for permitting an operator to manually lift the second jaw upwardly into said closed position.

3. A machine according to claim 1, including means for positioning an advanceable sheet of mesh-like material beneath the lower surface of said first jaw for preventing the melted material of the bag from sticking to said lower surface.

4. A heat sealing machine for sealing the open top portion of a preformed heat-sealable bag, comprising a stationary housing, an upper elongated clamping jaw fixedly mounted on said housing and defining thereon a lower clamping surface, heater means fixedly associated with said upper clamping jaw for heating same, a horizontally elongated lower clamping jaw positioned vertically below said upper clamping jaw and having thereon an upper clamping surface, elongated lever means pivotally mounted on said housing for swinging movement about a substantially horizontal pivot axis which extends substantially parallel to the elongated direction of said lower jaw, said lever means having said lower jaw fixedly mounted thereon adjacent the forward end thereof, said pivot axis being positioned intermediate the ends of said lever means, cam follower means mounted on said lever means adjacent the rearward end thereof, means normally biasing said lever means and said lower jaw for normally maintaining said lower jaw in a lowered open position, said lower jaw being manually swung upwardly about said pivot axis into a closed position wherein it engages said upper jaw, sensing means for sensing the movement of said upper jaw into said closed position, and rotary cam means actuated by said sensing means for engaging said cam follower means to thereby clampingly hold said lower jaw in said closed position for a predetermined time, said rotary cam means comprising a disc-like cam having a substantially annular peripheral cam surface thereon and positioned for engagement with said cam follower means when said lower jaw is in said closed position, said cam having a slot which projects radially inwardly thereof and interrupts said peripheral cam surface, said slot accommodating therein said cam follower means to permit swinging of said lever means so that said lower jaw is automatically returned into said open position following one complete revolution of said cam.

5. A machine according to claim 4, wherein the peripheral cam surface on said cam includes a first elongated portion which extends angularly away from one edge of said slot and is of a ramplike configuration for causing a gradual pressure increase between said clamping jaws, said peripheral cam surface including a second portion which extends angularly from the end of said first portion around to the other edge of said slot, said second portion being defined on a constant radius about the rotational axis of said cam for applying a constant clamping pressure between said jaws.

6. A heat-sealing machine for sealing the open top portion of a preformed heat-sealable bag, comprising a stationary housing, an upper elongated clamping jaw fixedly mounted on said housing and defining thereon a lower clamping surface, heater means fixedly associated with said upper clamping jaw for heating same, a horizontally elongated lower clamping jaw positioned vertically below said upper clamping jaw and having thereon an upper clamping surface, elongated lever means pivotally mounted on said housing for swinging movement about a substantially horizontal pivot axis which extends substantially parallel to the elongated direction of said lower jaw, said lever means having said lower jaw fixedly mounted thereon adjacent the forward end thereof, said pivot axis being spaced rearwardly from said jaws, cam follower means mounted on said lever means at a location spaced from said pivot axis, means normally biasing said lever means and said lower jaw for normally maintaining said lower jaw in a lowered open position, said lower jaw being manually swung upwardly about said pivot axis into a closed position wherein it engages said upper jaw, sensing means for sensing the movement of said upper jaw into said closed position, and movable cam means actuated by said sensing means for engaging said cam follower means to thereby clampingly hold said lower jaw in said closed position for a predetermined time corresponding to a predetermined movement of said cam means, said cam means having a peripheral cam surface thereon and positioned for engagement with said cam follower means when said lower jaw is in said closed position to hold said lower jaw in said closed position, said cam means having a slot which projects inwardly thereof and interrupts said cam surface, said slot accommodating therein said cam follower means to permit swinging of said lever means so that said lower jaw is automatically returned into said lowered open position following said predetermined movement of said cam means.

7. In a heat-sealing machine for sealing the open top of a manually-held preformed heat-sealable bag, said machine including a housing, a pair of jaws mounted on said housing adjacent the front vertical side thereof for permitting the open top of a bag to be manually inserted between said jaws, said jaws being disposed in opposed and relatively movable relationship toward and away from one another for permitting the open top of a preformed bag to be manually held therebetween, heater means associated with one of said jaws for creating a sealing strip across the bag adjacent the top thereof when the latter is held between the jaws, wherein said pair of jaws includes first and second jaws which are horizontally elongated and are positioned vertically one above the other, the improvement comprising said first jaw being disposed uppermost and being fixedly and stationarily connected relative to said housing, said heater means being fixedly associated with said first jaw, said second jaw being positioned vertically below said first jaw and movable substantially vertically between a lowered open position wherein the second jaw is spaced downwardly from the first jaw and a raised closed position wherein an upper clamping surface on said second jaw is substantially engaged with a lower clamping surface on said first jaw for permitting the open top portion of the bag to be clampingly held therebetween, support means movably mounting said second jaw on said housing for movement between said open and closed positions and for normally urging said second jaw into said open position, hand-engaging handle means fixed to said second jaw for permitting said second jaw to be manually moved upwardly from said open position into said closed position, said hand-engaging handle means being disposed closely adjacent and projecting forwardly from the clamping surface of said second jaw so that an operator can manually hold the bag top between the jaws and simultaneously lift the second jaw upwardly into said closed position, sensing means for sensing the positioning of said second jaw substantially in said closed position, power means activated by said sensing means for holding said second jaw in said closed position for a preselected time and for then automatically releasing said second jaw whereby said support means automatically returns said second jaw into said open position, said support means including elongated lever means pivotally supported on said housing for swinging movement about a substantially horizontal pivot axis which is spaced from and substantially parallel to the elongated direction of said second jaw, said second jaw being mounted on said lever means at a location spaced a substantial distance from said pivot axis, said power means being engageable with said lever means at a predetermined location thereon which is spaced from said pivot axis when said jaw is in said closed position for both holding said jaw in said closed position for said predetermined time and applying a controlled clamping pressure between said jaws throughout said predetermined time, said lever means having cam follower means mounted thereon at said predetermined location, and said power means including rotary motor means drivingly connected to rotatable cam means which is disposed for camming engagement with said follower means to hold said second jaw in said closed position.

8. A machine according to claim 7, wherein said cam means comprises a disc-like cam having a substantially annular camming surface extending around the periphery thereof and disposed for engagement with said cam follower means when said second jaw is in said closed position, said cam having a radial slot formed inwardly thereof for accommodating therein said follower means, whereby movement of said follower means into said slot permits said lever means to swingably move so that said second jaw is swung downwardly into said open position.

9. A machine according to claim 8, wherein said sensing means comprises electrical switch means positioned for activation by said lever means when said second jaw is manually moved upwardly into said closed position, activation of said switch means causing energization of said motor means so that said cam is rotated through one revolution whereby the cam profile thereon engages said follower means and holds said lever means and said second jaw in said closed position, said follower means entering into said slot following one complete revolution of said cam means for permitting swinging movement of said lever means so that said second jaw is automatically lowered into said open position to terminate the sealing operation.

10. A machine according to claim 9, wherein said elongated lever means has said pivot axis provided intermediate the length thereof, said second jaw being mounted on said lever means adjacent the forward end thereof in spaced relationship from said pivot axis, and said cam follower being mounted on said lever means adjacent the rearward end thereof in spaced relationship to said pivot axis, said pivot axis being disposed between said second jaw and said cam follower means so that said cam follower means is swung upwardly into the slot in said cam when said second jaw is swung downwardly into said open position, and said rotary cam being disposed above the rearward end of said lever means and positioned for rotation about an axis which is substantially parallel with said pivot axis.

11. A machine according to claim 10, wherein the weight of said second jaw and said lever means causes said second jaw to be automatically swingably returned into said open position.

12. In a heat-sealing machine for sealing the open top of a manually-held preformed heat-sealable bag, said machine including a housing, a pair of jaws mounted on said housing adjacent the front vertical side thereof for permitting the open top of a bag to be manually inserted between said jaws, said jaws being disposed in opposed and relatively movable relationship toward and away from one another for permitting the open top of a preformed bag to be manually held therebetween, heater means associated with one of said jaws for creating a sealing strip across the bag adjacent the top thereof when the latter is held between the jaws, wherein said pair of jaws includes first and second jaws which are horizontally elongated and are positioned vertically one above the other, the improvement comprising said first jaw being disposed uppermost and being fixedly and stationarily connected relative to said housing, said heater means being fixedly associated with said first jaw, said second jaw being positioned vertically below said first jaw and movable substantially vertically between a lowered open position wherein the second jaw is spaced downwardly from the first jaw and a raised closed position wherein an upper clamping surface on said second jaw is substantially engaged with a lower clamping surface on said first jaw for permitting the open top portion of the bag to be clampingly held therebetween, support means movably mounting said second jaw on said housing for movement between said open and closed positions and for normally urging said second jaw into said open position, hand-engaging handle means fixed to said second jaw for permitting said second jaw to be manually moved upwardly from said open position into said closed position, said hand-engaging handle means being disposed closely adjacent and projecting forwardly from the clamping surface of said second jaw so that an operator can manually hold the bag top between the jaws and simultaneously lift the second jaw upwardly into said closed position, sensing means for sensing the positioning of said second jaw substantially in said closed position, power means activated by said sensing means for holding said second jaw in said closed position for a preselected time and for then automatically releasing said second jaw whereby said support means automatically returns said second jaw into said open position, said support means including elongated lever means pivotally supported on said housing for swinging movement about a substantially horizontal pivot axis which is spaced from and substantially parallel to the elongated direction of said second jaw, said second jaw being mounted on said lever means at a location spaced a substantial distance from said pivot axis, said power means being engageable with said lever means at a predetermined location thereon which is spaced from said pivot axis when said jaw is in said closed position for both holding said jaw in said closed position for said predetermined time and applying a controlled clamping pressure between said jaws throughout said predetermined time, said lever means having cam follower means mounted thereon at said predetermined location, and said power means including cam means movable through a predetermined movement and disposed for camming engagement with said follower means to hold said second jaw in said closed position, said cam means having a peripheral camming surface disposed for engagement with said follower means when said second jaw is in said closed position, said cam means having a slot formed therein for interrupting said cam surface, said slot accommodating therein said follower means, whereby completion of said predetermined movement by said cam means results in said follower means entering into said slot so that said lever means automatically swings said second jaw downwardly into said open position to terminate the sealing operation.

* * * * *